United States Patent

[11] 3,587,229

[72] Inventor Joseph L. Peczkowski
 South Bend, Ind.
[21] Appl. No. 807,697
[22] Filed Mar. 17, 1969
[45] Patented June 28, 1971
[73] Assignee Bendix Corporation

[54] COMBUSTION ENGINE FUEL CONTROL HAVING GOVERNOR RESET MEANS
11 Claims, 4 Drawing Figs.

[52] U.S. Cl. .................................................. 60/39.16,
 60/39.28
[51] Int. Cl. .................................................. F02c 3/10,
 F02c 9/08
[50] Field of Search ........................................... 60/39.28,
 39.16

[56] References Cited
UNITED STATES PATENTS
3,309,868 3/1967 Downing et al. ............... 60/39.16
3,332,233 7/1967 McQueen ....................... 60/39.28
3,439,496 4/1969 Bevers ........................... 60/39.16

Primary Examiner—Al Lawrence Smith
Attorneys—Gordon H. Chenez and Plante, Arens, Hartz, Hix and Smith ABSTRACT: Engine governor mechanism adapted to produce a fuel controlling governor error output signal derived from opposing input reference and engine speed generated forces and provided with a force producing fluid pressure responsive member connected in force opposing relationship to the input reference force and responsive to a pressurized and compressible fluid signal derived from a source including an accumulator which signal is controlled by valve means responsive to the governor error output signal to thereby provide a governor feedback control circuit having lag-lead compensation. The above-described governor mechanism is particularly applicable to use with a gas turbine engine having independently rotating gas producer and power output turbines wherein the above-described governor mechanism is responsive to power turbine speed and may further include a second governor mechanism responsive to opposing forces derived from gas producer turbine speed and a reference force modified by a second force producing fluid pressure responsive member responsive to a second controlled fluid pressure controlled by the above-mentioned valve means independently of the pressurized and compressible fluid signal.

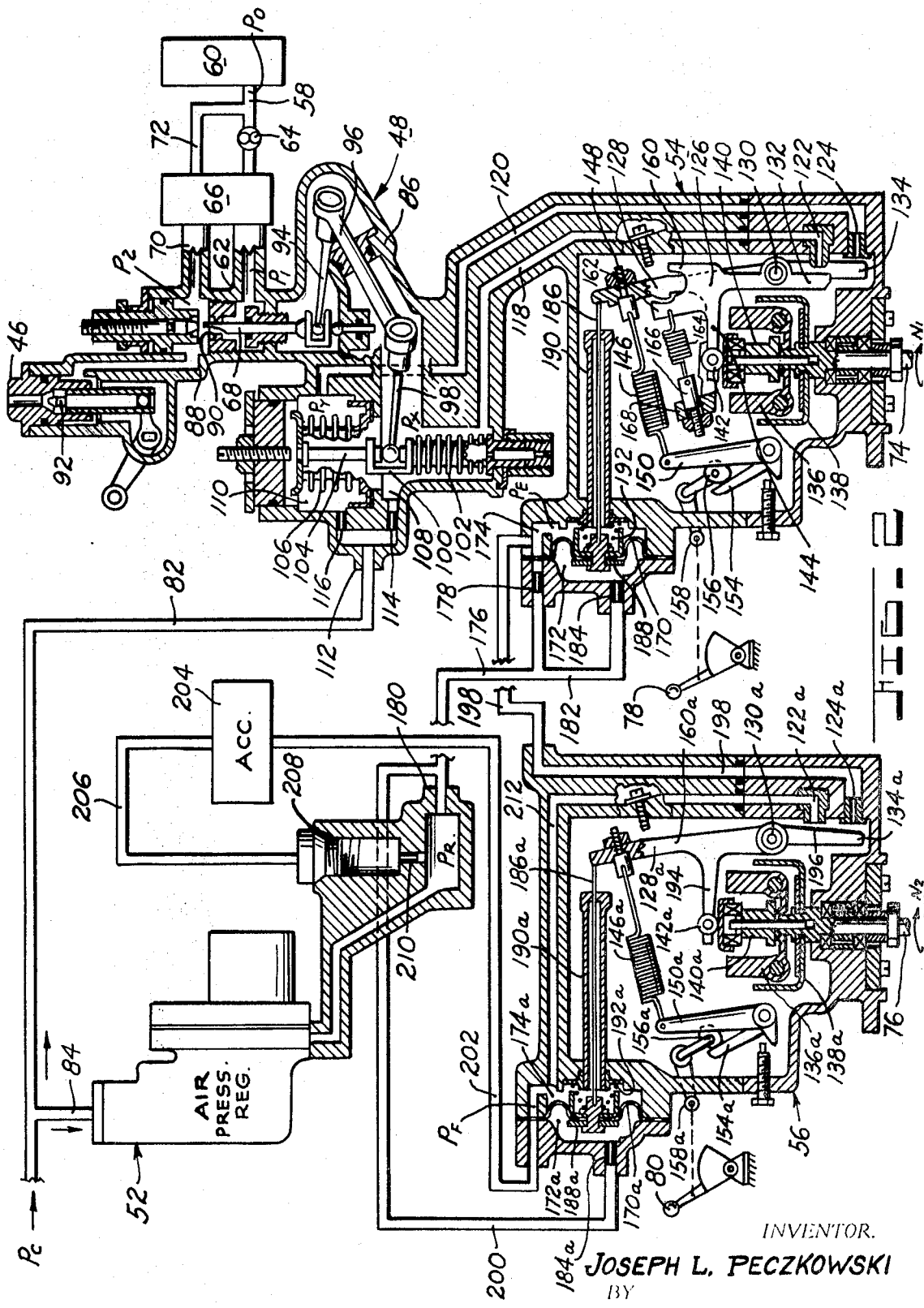

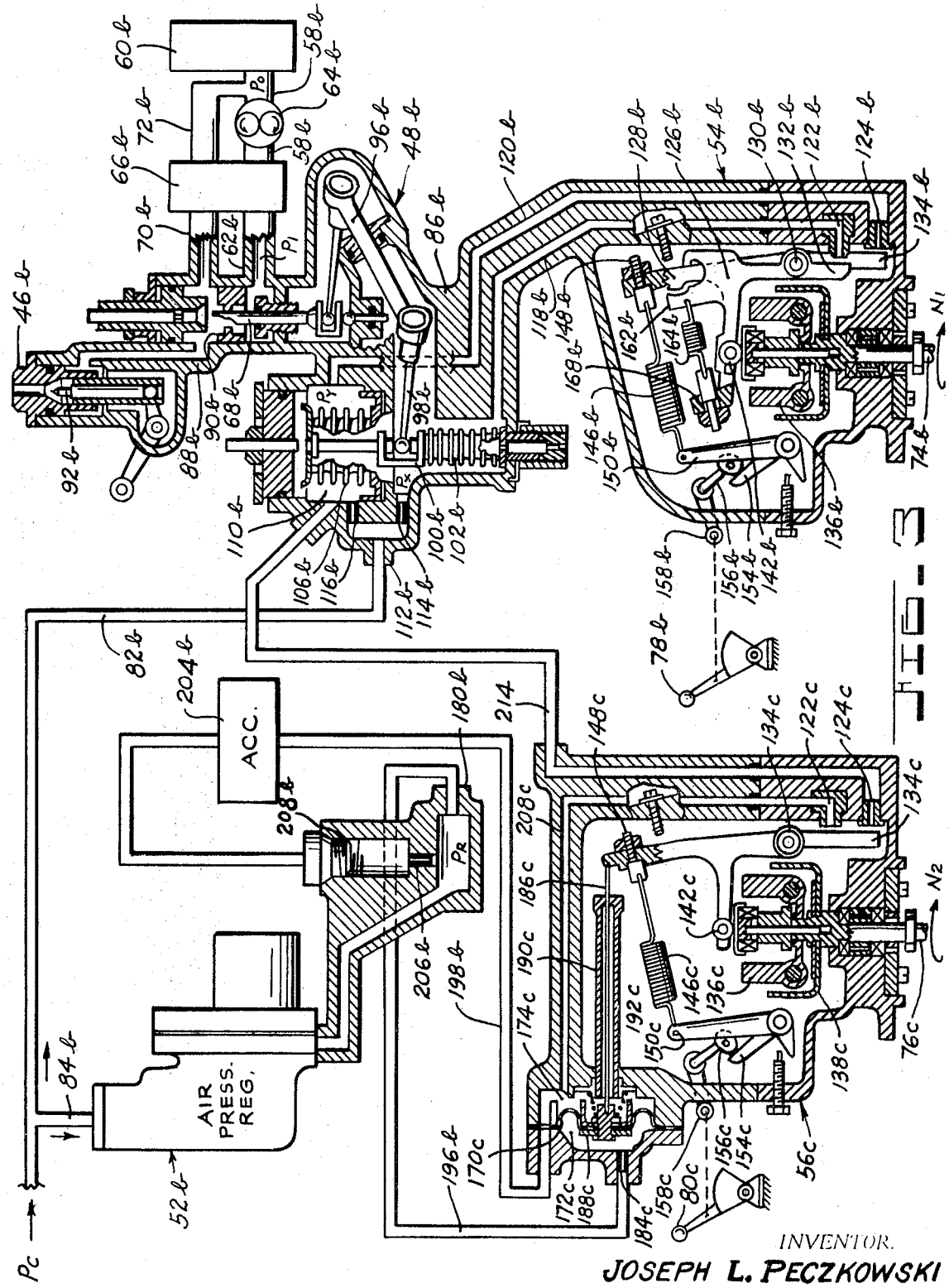

COMBUSTION ENGINE FUEL CONTROL HAVING GOVERNOR RESET MEANS

BACKGROUND OF INVENTION

The present invention is particularly adapted for use in controlling fuel flow to a gas turbine engine of the free turbine type such as that used to power helicopter aircraft. Those persons skilled in the art are aware of the engine governing problems encountered in governing operation at a selected speed of the free turbine and helicopter rotor driven thereby. Fuel flow to the engine is controlled by fuel control mechanism including governor apparatus responsive to the speed of the free turbine and thus helicopter rotor connected thereto via suitable gear and shafting means. Governing problems occur as a result of high inertia of the rotor as well as low spring rate of the driving shaft and poor damping characteristics of the rotor system which create speed oscillations in the free turbine and rotor system. The adverse effect of such speed oscillations on the governor mechanism and thus fuel flow to the engine results in unstable engine operation which is detrimental to engine efficiency and/or accurate engine governor output control.

SUMMARY OF THE INVENTION

It is an object of the present invention to provide an engine governor mechanism responsive to a speed error between request and actual engine speeds and providing initial rapid, low gain coupled with subsequent slow, high gain correction of engine fuel flow.

It is another object of the present invention to provide engine governor mechanism operating on a lagged regenerative principle wherein the characteristic lag time constant is derived from the compressibility of air.

BRIEF DESCRIPTION OF THE DRAWINGS

FIG. 2 represents a sectional view of the fuel control apparatus embodying the present invention of FIG. 1;

FIG. 3 represents a sectional view of the fuel control apparatus embodying a modified arrangement of the present invention.

DESCRIPTION OF THE PREFERRED EMBODIMENT

Figure 1:
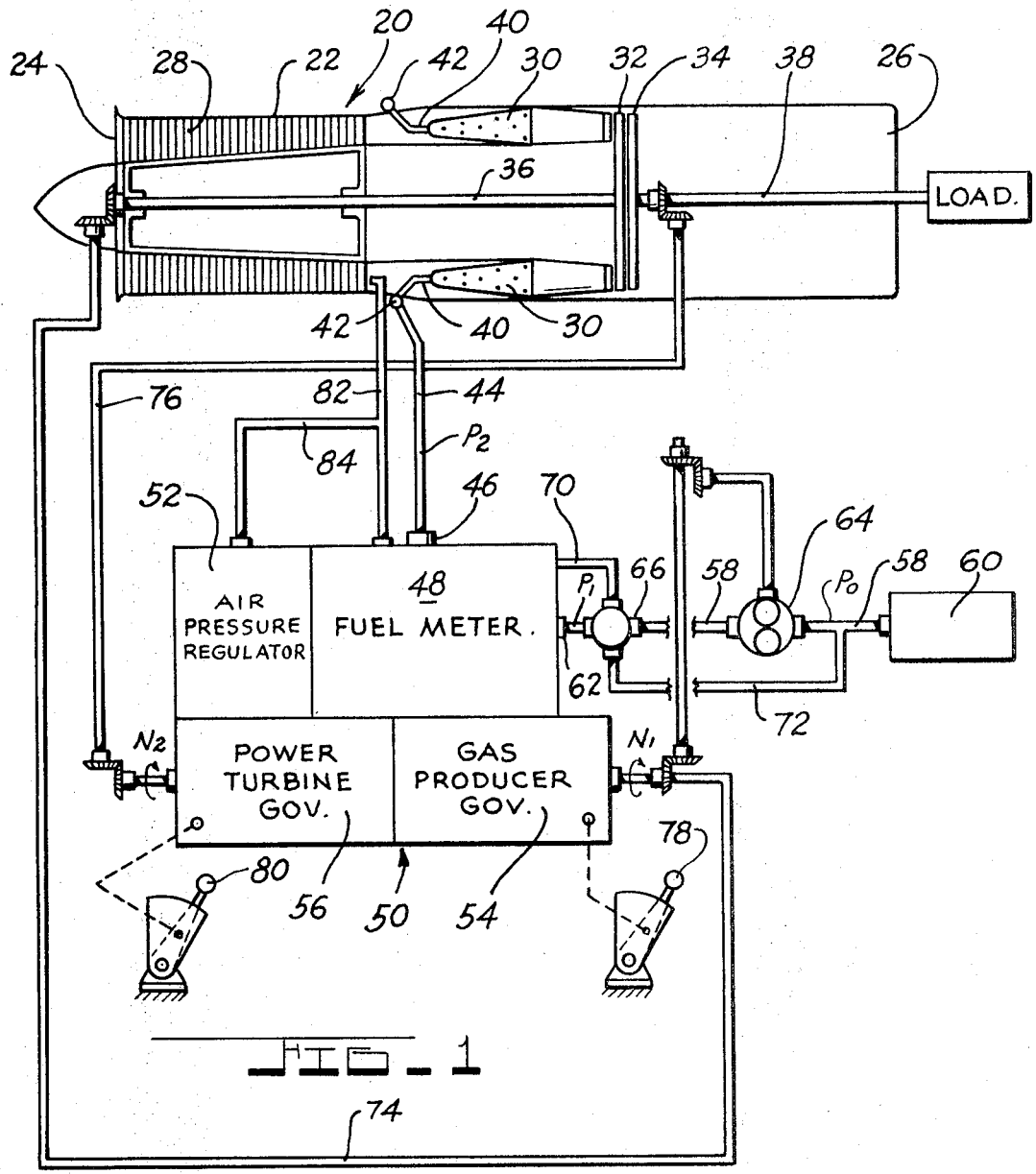
FIG. 1 represent a schematic illustration of a conventional gas turbine engine of the free turbine type and fuel control system embodying the present invention therefor.

Referring to FIG. 1, numeral 20 represents a conventional gas turbine engine having a casing 22 provided with air inlet 24 and exhaust gas outlet 26. A rotatable compressor 28 receives air from inlet 24 and discharges the same at increased pressure to combustion chambers 30 wherein pressurized fuel is injected to form a fuel air mixture which is ignited to generate hot motive gas. The hot motive gas discharged from combustion chambers 30 passes through a gas producer turbine 32 and free or power turbine 34 to drive the same. The spent hot motive gas exhausts to the atmosphere via outlet 26. The gas producer turbine 32 is connected to drive compressor 28 via a drive shaft 36 suitably mounted for rotation. The free or power turbine 34 is rotatable independently of turbine 32 and drives power absorbing apparatus labeled "load" via gear and shaft means generally indicated by 38.

A plurality of fuel injection nozzles 40 each connected to inject fuel into an associated combustion chamber 30 receive metered pressurized fuel from a fuel manifold 42. The fuel manifold 42 receives metered fuel at pressure $P_2$ via a conduit 44 leading from an outlet 46 of a fuel meter 48 forming part of a fuel control unit generally indicated by 50 which further includes an air pressure regulator 52, gas producer governor 54 and power turbine governor 56.

A fuel supply conduit 58 connected to transmit fuel from a fuel tank 60 to an inlet 62 of fuel meter 48 is provided with a conventional engine driven fuel pump 64 which generates an increase in fuel pressure from $P_o$ to $P_1$. A conventional fuel bypass valve unit generally indicated by 66 serves to regulate the pressure $P_1$ upstream from a variable area fuel metering valve 68 in fuel meter 48 (see FIG. 2) thereby controlling the pressure differential $P_1-P_2$ across metering valve 68. To that end, the bypass valve unit 66 is vented to pressure $P_2$ downstream of metering valve 68 via a passage 70 and to conduit 44 at relatively low pump inlet pressure $P_o$ via a passage 72. Fuel in excess of that required to maintain a predetermined constant pressure differential $P_1-P_2$ is diverted by a bypass valve, not shown, to passage 72 for recirculation through pump 64.

The gas producer governor 54 and the power turbine governor 56 are provided speed inputs designated $N_1$ and $N_2$, respectively, via conventional gear and shafting apparatus generally indicated by 74 and 76 connected to gas producer turbine 32 and power turbine 34, respectively. Control levers 78 and 80 connected to gas producer governor 54 and power turbine governor 56, respectively, through suitable linkage means provide reference inputs thereto as will be described.

The fuel meter 48 and air pressure regulator 52 are vented to compressor 28 discharge air at pressure $P_c$ via passage 82 and branch passage 84, respectively.

Referring to FIG. 2, the fuel meter 48, gas producer governor 54, and power turbine governor 56 are shown in section. Reference is made to U.S. Pat. application Ser. No. 754,081, filed Aug. 20, 1968, in the name of Robert C. Moore, Jr. (common assignee) now U.S. Pat. No. 3,516,250 issued June 9, 1970, which discloses a fuel control system similar in many respects to that shown in FIGS. 2 and 3.

The fuel meter 48 includes a casing 86 wherein fuel inlet and outlet ports 62 and 46, respectively, are connected by a flow conduit 88 including a fuel metering orifice 90 with which metering valve 68 cooperates to define a variable area metering orifice which establishes the effective flow area of conduit 88 and further including an operator actuated fuel shutoff valve 92 connected to control lever 78 and suitably positioned thereby to establish or disestablish flow out of outlet port 46 depending upon the position of control lever 78. Metered fuel flow out of outlet port 46 varies only as a function of the effective flow area established by the position of metering valve 68 since the fuel bypass valve unit 66 functions to maintain the $P_1-P_2$ differential across orifice 90 at a predetermined constant value, regardless of the flow area established by metering valve 68.

The metering valve 68 is slidably positioned axially by an output arm of a conventional torque tube assembly 96 suitably secured to casing 86. An input arm 98 of torque tube assembly 96 is engaged by a U-shaped retaining member 100 which has one leg thereof fixedly secured to the movable end of an evacuated bellows 102 and the second leg thereof fixedly secured via a stem 104 to the movable end of a bellows 106 having a relative large end area compared to bellows 102. The bellows 102 and 106 may be termed an acceleration bellows and a governor bellows, respectively, for reasons which will be apparent from the following description of operation. The acceleration bellows 102 is anchored at one end to casing 86 and externally exposed to an air pressure $P_x$ in a chamber 108. The governor bellows 106 is anchored at one end to casing 86 and separates chamber 108 at pressure $P_x$ from a chamber 110 at pressure $P_y$. The pressure $P_x$ and $P_y$ are derived from compressor discharge air pressure $P_c$ supplied to chambers 108 and 110 via passage 82, port 112 in casing 86 and restrictions 114 and 116 leading from port 112 to chambers 108 and 110, respectively.

The pressures $P_x$ and $P_y$ and thus force output of bellows 102 and 106 are influenced by the governor 54. To that end, chambers 108 and 110 are provided with outlet passages 118 and 120 having orifices 122 and 124, respectively, at the discharge ends thereof. Governor levers 126 and 128 pivotally mounted on a fixed support 130 are provided with valve flapper portions 132 and 134, respectively, which move toward or away from respective orifices 122 and 124 to decrease or increase the effective flow area thereof accordingly.

The governor 54 includes a pair of centrifugal speed weights 136 pivotally mounted on a rotatable table 138 which is driven at speed $N_1$ by gas producer turbine 32 via gears and shafting 74. The speed weights 136 bear against a thrust member 140 slidably carried for axial movement on table 138 which thrust member, in turn, bears against a roller 142 rotatably carried on an arm 144 of lever 126.

The lever 128 is loaded by a force derived from a tension spring 146 having one end secured to an adjustable retainer 148 carried by lever 128 and an opposite end secured to a lever 150 pivotally mounted on a fixed support 152. An arm 154 integral with lever 150 is actuated by a cam 156 which is rotatably positioned by a lever 158 responsive to the position of control lever 78.

The lever 128 is adapted to engage spaced apart arm portions 160 and 162 integral with lever 126 which arm portions are spaced to provide limited relative movement between lever 128 and lever 126. A tension spring 164 is secured at one end to arm 162 and at the opposite end to an adjustable retainer 166 secured to an arm 168 integral with lever 128 thereby tending to load lever 126 in a direction causing arm 160 to engage lever 128 as shown.

Governor 54 further includes reset mechanism defined by a diaphragm 170 which separates chambers 172 and 174 and is secured at its radially outermost portion to casing 86 by any suitable means providing an airtight seal. Chamber 172 is vented via a passage 176 containing a restriction 178 to an outlet port 180 of air pressure regulator 52. Chamber 174 is vented via a branch passage 182 containing a restriction 184 to passage 176. A rod 186 axially aligned with diaphragm 170 is fixedly secured at one end thereto via any suitable connecting means generally indicated by 188 which includes diaphragm backing plates and associated rivet securing the plates to diaphragm 170. The rod 186 extends through a tubular support 190 fixedly secured at one end to casing 86 by any suitable connecting means providing an airtight seal. The rod 186 is slidably carried by the closed opposed end of tubular support 190 and extends therethrough into engagement with lever 128. A compression spring 192 interposed between casing 86 and one of the backing plates secured to diaphragm 170 preloads diaphragm 170 in a direction tending to urge rod 186 away from lever 128.

The air pressure regulator 52 is a conventional fluid pressure regulating valve mechanism of well-known construction and operation such that details of the internal structure therein may be omitted. In general, the air pressure regulator 52 functions to receive compressor discharge air at relatively high pressure $P_c$ and reduce the same to a relatively lower constant regulated pressure $P_r$ which, in turn, is transmitted to chamber 172 and 174.

The power turbine governor 56 is identical in most respects to the gas producer governor 54 and corresponding structure thereof is identified by like numerals with a letter subscript $a$ added. However, it will be noted that the governors 56 and 54 differ in that lever 126 and associated structure including spring 164 and flapper 132 are deleted from governor 56. The lever 128 is modified to include an arm portion 194 which carries roller and a flapper portion 196 which coacts with orifice 122a.

The orifice 124a is connected via a passage 198 to chamber 174 wherein a pressure $P_e$ is generated as a function of the effective flow area of orifice 124a as established by the position of flapper 134a. The chamber 172a is vented to regulated air pressure $P_r$ via a passage 200 connected to passage 176. The chamber 174a is vented via a passage 202 to a conventional air accumulator generally indicated by 204. The accumulator 204 is connected to receive air at regulated air pressure $P_r$ via a passage 206 from an outlet port 208 containing a restriction 210 of air pressure regulator 204. A discharge passage 212 vents chamber 174a to orifice 122a, the effective area of which is controlled by flapper 196 of lever 128a to regulate air pressure $P_r$ in chamber 174a accordingly.

DESCRIPTION OF THE MODIFIED EMBODIMENT

Referring to FIG. 3, the elements thereof similar to those of FIG. 2 with the exception of power turbine governor 56 are identified by like numerals with a letter subscript $b$ added. The corresponding elements of power turbine governor 56 are provided with a letter subscript $c$.

It will be noted that the governor reset mechanism including diaphragm 170 and rod 186 of gas producer governor 54 has been deleted from FIG. 3 and the power turbine governor 56 vented accordingly to control the air pressure $P_y$ in fuel meter 48b. To that end, the orifice 124c is vented via a passage 214 to chamber 110b of fuel meter 48b.

MODE OF OPERATION OF THE PREFERRED EMBODIMENT

Figure 4:
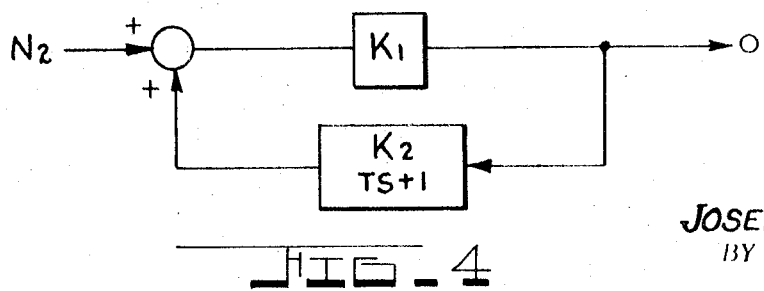
FIG. 4 represents a functional block diagram of the present invention.

Referring to FIG. 4, $N_2$ represents speed input to governor 56, 0 represents the governor 56 output which for practical purposes may be considered the effective opening of orifice 124a, $K_1$ represents proportional gain of the governor 56, $K_2$ represents reset gain of the governor 56, $\tau$ represents the lag time constant of the reset circuit of governor 56 and S represents the LaPlace operator. The transfer function from input $N_2$ to output O may be represented by the relationship:

$$\frac{O}{N_2} = \frac{\left(\frac{K_1}{1-K_1K_2}\right)(\tau s+1)}{\frac{\tau}{1-K_1K_2}s+1}$$

It will be noted that the lag time constant, $\tau$, appears as a lead in the governor transfer function. The governor gain and governor lag time constant (denominator) vary together as a function of the loop gain $K_1 K_2$. The governor gain and lag time constant become larger as $K_1 K_2$ approaches the value 1 thereby providing means for obtaining a high governor gain and large lag time constant by controlling the loop gain near the value of 1.

For description purposes, it will be assumed that the gas turbine engine is mounted in a conventional helicopter, not shown, and output shaft 38 of power turbine 34 connected to drive the helicopter rotor. A conventional manner of controlling engine operation in such a case is to set the gas producer control lever 78 to a maximum speed and thus power position and control the rotational speed of the helicopter rotor by setting the power turbine control lever 80 to a maximum speed position. The engine power requirement to maintain the speed of power turbine 34 and thus the helicopter rotor driven thereby at the selected maximum speed will vary depending upon the position of a pilot operated pitch control lever, not shown, which establishes a desired blade pitch of the helicopter rotor and thus load on power output turbine 34 to meet desired helicopter operation.

Assuming the engine 20 to be self-sustaining in operation with the gas producer governor control lever 78 at idle position and power turbine governor control lever 80 at maximum speed position, the power turbine 34 may or may not attain the requested maximum speed depending upon load conditions imposed thereon by the helicopter rotor.

The gas producer turbine 32 is accelerated in response to movement of control lever 78 to a maximum power position which rotates cam 156 causing lever 150 to move, thereby increasing the force load of spring 146 on lever 128 accordingly. The lever 128, in turn, through arm 168 thereof and spring 164 attached to lever 126 urges roller 142 downward against the opposing lower force of governor weights 136.

The flappers 134 and 132 respond to movement of levers 128 and 126, respectively, and close the respective orifices 124 and 122. The resulting increase in air pressure $P_y$ and $P_x$ in chambers 110 and 108, respectively, eliminates the $P_y-P_x$ pressure differential across governor bellows 106 whereupon the relatively smaller area acceleration bellows 102 responds to the increased air pressure $P_x$ causing torque tube assembly 96 to drive metering valve 68 in an opening direction relative to orifice 90. Fuel flow increases in accordance with the increased area of orifice 90 across which the bypass valve 66 maintains a constant $P_1-P_2$ fuel pressure differential thereby initiating acceleration of gas producer turbine 32 and compressor 28 driven thereby. As compressor 28 speed increases, the compressor discharge air pressure $P_c$ imposed against acceleration bellows 102 increases accordingly, resulting in a progressive increase in flow area or orifice 90 and thus fuel flow therethrough to the combustion chambers 30 as a predetermined function of compressor discharge air pressure $P_c$ which controls the rate of change of speed of turbine 32 in accordance with the compressor 28 stall characteristics. Upon reaching a predetermined speed of turbine 32 at which fuel flow enrichment may be tolerated, the force of centrifugal weights 136 overcome spring 164 causing lever 126 to pivot relative to lever 128 to the extent of the gap between arm portion 162 and lever 128. The flapper 132 moves accordingly to open orifice 122, thereby decreasing pressure $P_x$ in chamber 108 to generate a $P_y-P_x$ pressure differential across governor bellows 106. The resulting decrease in force output of acceleration bellows 102 is more than compensated for by the increases in force output of the relatively larger area governor bellows 102. The net result is an increase in force over that obtained by bellows 102 alone tending to further open metering valve 68 which, in turn, produces a corresponding enriched metered fuel flow schedule and thus increase in acceleration of turbine 32.

The power turbine 34 speed increases as compressor 28 and turbine 32 accelerate. The power turbine 34 accelerates toward the selected maximum speed established by control lever 80 which, through cam 156a, lever 150a and spring 146a, imposes a corresponding input force against lever 128 a and thus roller 142a. The input force applied by roller 142a against thrust member 140a overcomes the opposing force generated by centrifugal weights 136a as a result of the underspeed condition of power turbine 34 resulting in pivotal movement of lever 128a, whereupon flappers 134a and 196 close orifices 124a and 122a, respectively. The air pressures $P_f$ and $P_e$ in chambers 174a and 174, respectively, increase accordingly to maximum source pressure $P_c$, thereby eliminating the pressure differential $P_c-P_f$ and $P_c-P_e$ across diaphragms 170a and 170, respectively, causing the respective rods 186a and 186 to retract and unload associated levers 128a and 128.

It will be understood that the power turbine 34 may reach its selected speed $N_2$ at various engine power output levels below the demand maximum power output established by control lever 78, depending upon the load conditions generated by the helicopter rotor. Assuming a relatively light load imposed on power turbine 34 by the rotor, the power turbine 34 will attain its requested maximum speed while the gas producer turbine 32 is significantly underspeed. Therefore, as the power turbine 34 approaches its selected maximum speed, the force generated by centrifugal weights 136a overcomes the opposing force of spring 146a causing the lever 128a to pivot clockwise which, in turn, urges flappers 134a and 196 away from orifices 124a and 122a, respectively. The resulting drop in pressure $P_e$ in chamber 174 and corresponding pressure differential $P_c-P_e$ generated across diaphragm 170 loads rod 186 into engagement with lever 128, thereby imposing a corresponding governor reset force against the latter in opposition to spring 146, thereby reducing the effective input force opposing centrifugal weights 136 accordingly, causing clockwise movement of lever 128. The flapper 134, in turn, moves away from orifice 124 producing a decrease in pressure $P_y$ in chamber 110 and a corresponding $P_x-P_y$ differential across governor bellows 106 which loads torque tube assembly 96 in a direction to close metering valve 68 and reduce metered fuel flow to combustion chambers 30 accordingly, thereby initiating a characteristic proportional governor break of gas producer governor 54.

The expected drop in pressure $P_f$ in camber 174a as a result of opening orifice 122a is delayed by virtue of the accumulation of air in accumulator 204 which is released, thereby controlling the rate of change of pressure $P_f$ depending upon the volume characteristics of accumulator 204. The resulting pressure differential $P_c-P_f$ generated across diaphragm 170a loads rod 186a into engagement with lever 128a, thereby imposing a corresponding governor reset force against the latter in opposition to spring 146a, to reduce the effective input force opposing centrifugal weights 136a accordingly. In effect, the pressure $P_f$ acts as a lagged regenerative signal derived from the response of lever 128a to the output force of centrifugal weights 136a or, in other words, as a power turbine 34 speed reset signal generator wherein a predetermined lagged reset is imposed on the speed signal.

The speed of power turbine 34 continues to increase causing a progressive simultaneous increase in effective flow area of orifice 122a and 124a, thereby producing an increase in pressure differential $P_c-P_f$ and $P_c-P_e$ across diaphragm 170a and 170, respectively, as a function of the speed of power turbine 34. The output force of diaphragm 170 increases accordingly and imposes a corresponding increasing reset force against lever 128 in opposition to spring 146 which, in turn, results in a decrease in pressure $P_y$, as well as pressure $P_x$ in the event that lever 128 bears against lever 126, thereby reducing the net force output of governor bellows 106 and acceleration bellows 102, such that metering valve 68 moves in a closing direction to reduce the area of metering orifice 90. The resulting progressive decrease in metered fuel flow to combustion chambers 30 causes power turbine 34 to ultimately stabilize at the requested maximum speed as the force of spring 146a and opposing force of weights 136a plus reset force exerted by diaphragm 170a balance. Likewise, gas producer turbine 32 stabilizes at a speed corresponding to the combined force of centrifugal weights 136 and diaphragm 170 required to balance opposing spring 146.

Overspeed and underspeed of power turbine 34 from the governed maximum speed thereof results in a corresponding force unbalance between spring 146a and centrifugal weights 136a. Overspeed of turbine 34 results in an immediate response of centrifugal weights 136a which, in turn, results in a corresponding increase in area of orifices 122a and 124a and increase in force output of diaphragm 170 which resets spring 146 thereby proportionally reducing metered fuel flow to the combustion chambers in the heretofore described manner. The initial reset force generated by diaphragm 170 and related decrease in metered fuel flow is characterized by a rapid, low gain correction of metered fuel flow in response to the turbine 34 overspeed thereby promoting stability of operation. The delayed increase in reset force derived from pressure $P_f$ acting against diaphragm 170a and imposed on lever 128a to further open orifice 124a is characterized by a slow, high gain correction of metered fuel flow.

The above-described sequence of operation for an overspeed condition is reversed in the case of an underspeed condition of turbine 34.

The above-described sequence of operation during an engine acceleration is reversed for an engine deceleration to a requested lower than existing speed of turbine 34.

MODE OF OPERATION OF THE MODIFIED EMBODIMENT

Referring to FIG. 3, the operation of the power turbine governor 56c is identical to that of FIG. 2 with the exception that orifice 124c controls pressure $P_y$ directly, thereby providing fuel flow reset rather than gas producer governor 54b reset as in the case of FIG. 2. To that end, the gas producer governor 54b controls pressure $P_x$ and $P_y$ as described heretofore depending upon the force relationship between centrifugal weights 136b and opposing reference force of spring 146b.

The power turbine governor 56c controls pressure $P_y$ acting against governor bellows 106b in overriding relationship to the control of pressure $P_y$ established by gas producer governor 54b to thereby control metered fuel flow as a function of power turbine 34 speed. Those skilled in the art will recognize that control of metered fuel flow by either gas producer governor reset or by fuel flow reset may be desired depending upon the control characteristics of the engine.

The present invention has been shown and described in a preferred form wherein compressible air is utilized to provide the governor lagged reset force. However, it will be recognized that a noncompressible fluid may be utilized instead of air in which case the control circuit associated with the power turbine governor reset diaphragm 170a may be suitably modified to obtain the delayed reset as a function of diaphragm 170a displacement.

I claim:

1. Control apparatus for a variable speed combustion engine, said control apparatus comprising:
   fuel control means responsive to an input signal for regulating fuel flow to the engine a a function of said input signal;
   engine governor means responsive to opposing reference and engine speed generated forces for controlling said input signal;
   governor reset means including fluid pressure responsive means responsive to a controlled fluid pressure and operatively connected to said governor means for imposing a governor reset force thereon in opposition to said reference force; and
   means responsive to said engine speed generated force for controlling said controlled fluid pressure in response to engine speed.

2. Control apparatus as claimed in claim 1 and further including:
   means operatively connected to said fluid pressure responsive means for delaying the response of said controlled fluid pressure to said last named means in response to a change in engine speed.

3. Control apparatus as claimed in claim 1 wherein:
   said controlled fluid pressure is derived from a pressurized fluid source including a conduit having a first restriction and a second restriction downstream from and in series flow with said first restriction;
   said means responsive to said engine speed generated force including valve means operatively connected to said second restriction for controlling the effective flow area thereof and thus said controlled fluid pressure intermediate said first and second restrictions.

4. Control apparatus as claimed in claim 3 and further including:
   an air accumulator connected to said conduit intermediate said first and second restrictions and operative to impose a delay on the response of said controlled fluid pressure to variations in effective flow area of said second restriction.

5. Control apparatus as claimed in claim 1 wherein said combustion engine is a gas turbine engine having an air compressor and independently rotating gas producer and power output turbines and wherein:
   said controlled fluid pressure is derived from a source of compressor pressurized air regulated to a substantially constant pressure.

6. Control apparatus as claimed in claim 1 wherein said combustion engine is a gas turbine engine having an air compressor, a gas producer turbine connected to drive the air compressor and an independently rotating power output turbine and wherein:
   said engine governor means includes centrifugal weight means operatively connected to and rotated by said power turbine for producing said engine speed generated force, lever means responsive to said reference force and opposing power turbine speed generated force, valve means operatively connected to said lever means for controlling said controlled fluid pressure, and force transmitting means operatively connecting said fluid pressure responsive means and said lever means.

7. Control apparatus as claimed in claim 6 wherein:
   said input signal to said fuel control is derived from compressor pressurized air and modified by second valve means operatively connected to said lever means.

8. Control apparatus as claimed in claim 1 wherein said combustion engine is a gas turbine engine having an air compressor, a gas producer turbine connected to drive said compressor and an independently rotating power output turbine and wherein:
   said engine governor means includes a first governor responsive to a first reference force and an opposing force generated as a function of the speed of the power turbine and a second governor responsive to a second reference force and opposing force generated as a function of the speed of the gas producer turbine for controlling said input signal;
   said governor reset means includes a first fluid pressure responsive means responsive to a first controlled fluid pressure and connected to said first governor for imposing a first reset force therein in opposition to said first reference force and a second fluid pressure responsive means responsive to a second controlled fluid pressure and connected to said second governor for imposing a second reset force thereon in opposition to said second reference force;
   first and second valve means operatively connected to said first governor and actuated thereby in response to said power turbine speed generated force for controlling said first and second controlled fluid pressures, respectively.

9. Control apparatus as claimed in claim 8 wherein:
   said first and second controlled fluid pressures are derived from a compressor pressurized air source; and
   said first controlled air pressure is operatively connected to an air accumulator which is operative to impose a predetermined buildup time on the response of said first controlled air pressure to said first valve means.

10. Control apparatus as claimed in claim 8 wherein:
    said first reference force is variable and generated by first resilient means in response to the position of a first control lever operatively connected thereto;
    said second reference force is variable and generated by second resilient means in response to the position of a second control lever operatively connected thereto.

11. Control apparatus as claimed in claim 6 wherein:
    said fuel control means includes variable area fuel metering valve means, air pressure responsive means operatively connected to said metering valve means and responsive to said input signal for actuating said metering valve means to vary the area thereof and means responsive to the fuel pressure differential across said metering valve means for maintaining said pressure differential at a predetermined constant value;
    said input signal is derived from compressor pressurized air;
    said engine governor means further includes second valve means operatively connected to said lever means for modifying said compressor generated air pressure to which said air pressure proportionally responsive means responds.